Dec. 24, 1940.  E. O. BENNETT  2,225,949
METHOD FOR REMOVING OIL FROM WELLS
Filed Aug. 3, 1936
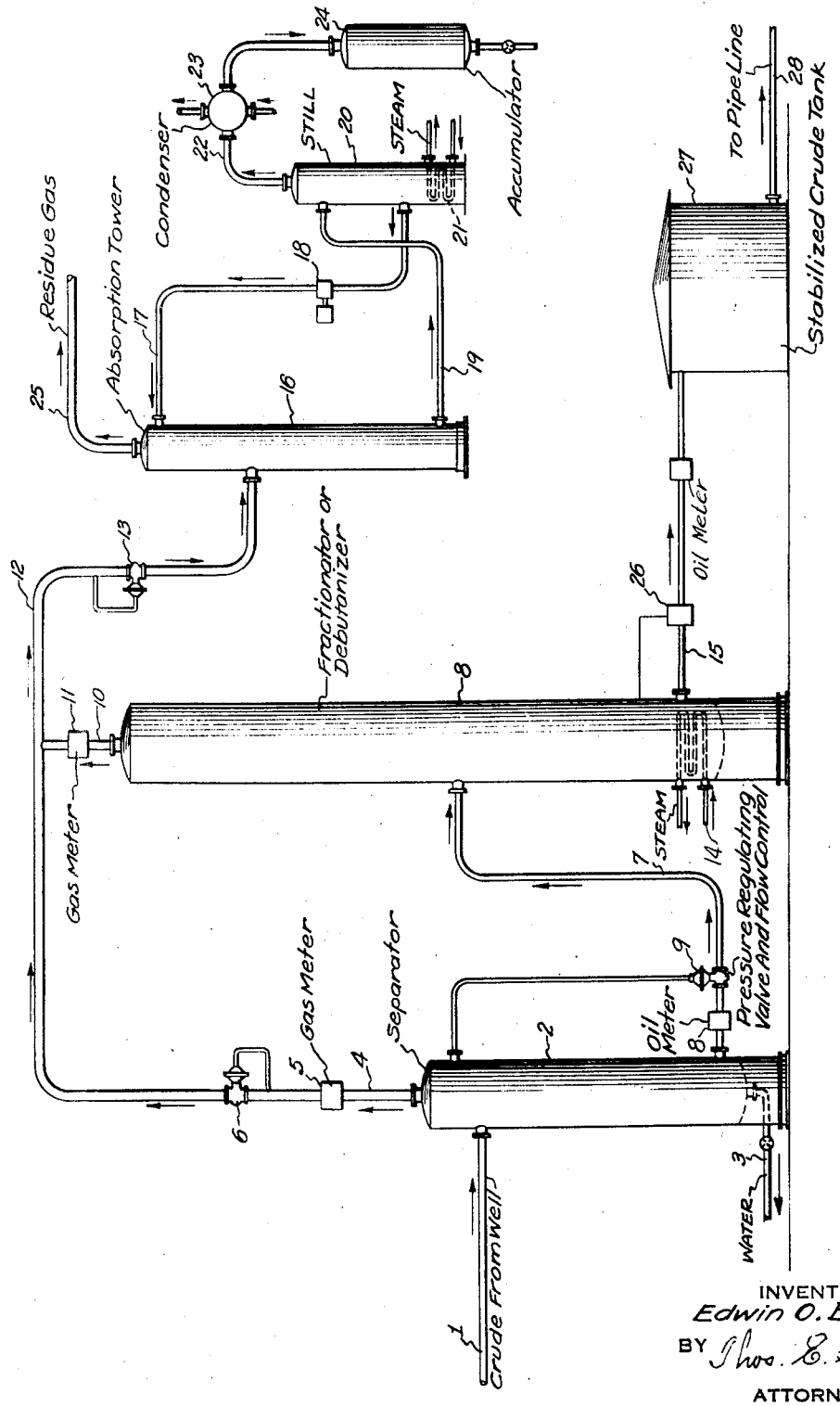
INVENTOR
Edwin O. Bennett
BY Thos. E. Scofield
ATTORNEY Patented Dec. 24, 1940

2,225,949

UNITED STATES PATENT OFFICE 2,225,949

METHOD FOR REMOVING OIL FROM WELLS

Edwin O. Bennett, Ponca City, Okla., assignor to Continental Oil Company, Ponca City, Okla., a corporation of Delaware Application August 3, 1936, Serial No. 93,941

2 Claims. (Cl. 196—7)

My invention relates to a method for removing oil from wells and more particularly to a method of preventing production losses in the operation of oil leases.

Ordinary practice, as now universally used, contemplates the removal of crude oil from wells, the passing of the crude oil through a separator to remove gases and water, and the passing of the oil to a lease gauge tank in which the oil is gauged under atmospheric pressure and at atmospheric temperature. The volume obtained by gauging is corrected to standard conditions of temperature and pressure. With crudes of high gravity, the evaporation losses in standard procedure are high especially where hot winds blow, as is usually the case in the Gulf Coast and Texas fields. I have measured evaporation losses as high as 20 percent.

One object of my invention is to provide a method of removing crude oils from wells in which evaporation losses are minimized.

Another object of my invention is to provide a method of removing oil from wells in which the production may be metered under well pressure instead of being gauged at atmospheric pressure as is now the common practice.

Another object of my invention is to provide a method of removing oil from wells in which the weathering losses are avoided.

Another object of my invention is to provide a method of removing oil from wells in which the use of gauge tanks is avoided.

Other and further objects of my invention will appear from the following description.

The accompanying drawing is a schematic view of one form of apparatus embodying the apparatus capable of carrying out the method of my invention.

In general, my invention contemplates the provision of a battery of high pressure separators in the vicinity of a stabilization plant located in the approximate center of the oil field. I employ an individual separator for each lease. The oil from each separator goes through a meter adjacent to the separator at pressures ranging from 50 to 500 pounds by well pressure. The oil from the separator is passed through a fractionator or debutanizer in which the light ends are fractionated off. The light ends are passed to an absorption tower and through a gasoline plant where approximately 50 percent of the light ends are recovered as stable gasoline. The percentage of recovery is dependent on the cut made into the crude. The balance of the light ends are passed off as residue gas. The oil from the debutanizer goes to the pipe line as stabilized crude.

More particularly referring now to the drawing, a crude from a particular well passes through pipe 1 to a high pressure separator 2 which may be of any suitable design. It is understood that each lease is provided with its own separator. The crude from a number of producing wells on a particular lease may pass through pipe 1 to the separator 2 for that particular lease. Water is removed through pipe 3 and gas is removed through pipe 4, through a gas meter 5. The separator is operated at well pressures ranging from 50 to 500 pounds or more per square inch. The meter may be of any suitable design, but I prefer to employ a positive displacement type of meter which may be temperature compensated. The pressure on the separator is maintained by pressure operated valve 6. The oil leaves the separator 2 through line 7, through an oil meter 8 which accurately measures the crude oil. The meter is of the positive displacement type and is temperature compensated. The pressure upon separator 2 is maintained by pressure regulating and flow control valve 9. The crude oil passes from line 7 into the fractionating tower or debutanizer 8 which is so regulated that butane and all lighter fractions pass overhead through line 10, through a gas meter 11 into the pipe 12 where the gases join gases from the separator 2. The pressure upon the fractionating tower is controlled by pressure regulating valve 13. Steam may be introduced through line 14 for controlling the temperature of the bottom of the fractionating tower 8. The oil withdrawn from the fractionating tower through line 15 is stabilized to about the same value as that to which it would weather in ordinary practice.

The gases pass from line 12 into an absorption tower 16 into which a liquid menstruum is introduced through line 17 by pump 18. The rich absorption menstruum is withdrawn from the tower 16 through a line 19 and is introduced into a still 20 in which the absorbed gases are stripped by means of a steam coil 21. The light gasoline fractions thus stripped from the absorption medium pass overhead through line 22 and are condensed in condenser 23 and collected in accumulator 24. The gasoline thus recovered represents about 50 percent of the overhead cut removed in the debutanizer 8. The residue gas leaves the absorption tower through line 25. The stabilized crude withdrawn from the debutanizer 8 through line 15 is controlled by float controlled valve 26 and passes to stabilized crude storage tank 27 from whence it is withdrawn through line 28 and passed to the pipe line.

My method enables a saving of 10 percent or more of the gross production which, in the case of a lease producing 5,000 barrels per day, amounts to a monetary value in excess of $500.00.

It will be observed that I have accomplished the objects of my invention. I am enabled to accurately measure live crudes by the use of meters under high pressures. The employment of meters in connection with the stabilization plant enables me to so handle the flow that there will be no weathering losses of the salable products. I am enabled to operate the entire pool from a central point in the field where all wells flow. By my method, employing temperature compensated means for the measuring of live crudes, the operation of an oil field or oil leases can be conducted without gauge tanks.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of treating crude oil as it comes directly from an oil well, comprising the steps of subjecting said oil to a separating operation to separate light gases therefrom in a zone maintained at superatmospheric pressure of at least fifty pounds per square inch, withdrawing the light gases from the separating zone, metering the withdrawn gases metering the liquid oil withdrawn from said separating zone, fractionating the crude oil withdrawn from the separating zone, controlling the fractionation so that light gasoline fractions and lighter hydrocarbons will be in the gaseous or vapor state, withdrawing the light gasoline vapors and gases from the fractionating zone, metering the gases and light gasoline vapors thus withdrawn and subjecting the light gasoline vapors and gases to a gasoline recovery operation, withdrawing a stabilized crude oil from the fractionating zone and metering the withdrawn stabilized crude oil, the method being such that weathering losses due to gauging are substantially eliminated.

2. A method of treating crude oil as it comes directly from an oil well, comprising the steps of subjecting said oil to a separating operation to separate light gases therefrom in a zone maintained at a pressure of at least fifty pounds per square inch, withdrawing the light gases from said separating zone, metering the withdrawn gases, metering the liquid oil withdrawn from said separating zone, fractionating the crude oil withdrawn from the separating zone, controlling the fractionation so that the light gasoline fractions and lighter hydrocarbons will be in a gaseous or vapor state, withdrawing the light gasoline vapors and gases from the fractionating zone, metering the gases and light gasoline vapors thus withdrawn, withdrawing a stabilized crude from the fractionating zone and metering the withdrawn stabilized crude, the method being such that the weathering losses due to gauging are substantially eliminated.

EDWIN O. BENNETT.